(12) United States Patent
Barrick

(10) Patent No.: US 7,152,152 B2
(45) Date of Patent: Dec. 19, 2006

(54) METHOD OF AVOIDING FLUSH DUE TO STORE QUEUE FULL IN A HIGH FREQUENCY SYSTEM WITH A STALL MECHANISM AND NO REJECT MECHANISM

(75) Inventor: Brian Barrick, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 10/763,089

(22) Filed: Jan. 22, 2004

(65) Prior Publication Data

US 2005/0166037 A1    Jul. 28, 2005

(51) Int. Cl.
*G06F 9/38* (2006.01)
(52) U.S. Cl. ........................... 712/220; 712/219
(58) Field of Classification Search ............... 712/220, 712/219
See application file for complete search history.

(56) References Cited

U.S. PATENT DOCUMENTS

| | | | | |
|---|---|---|---|---|
| 5,455,924 A | * | 10/1995 | Shenoy et al. | 711/118 |
| 5,742,831 A | * | 4/1998 | Creta | 710/244 |
| 5,949,971 A | * | 9/1999 | Levine et al. | 714/47 |
| 6,542,987 B1 | * | 4/2003 | Fischer et al. | 712/217 |
| 6,877,086 B1 | * | 4/2005 | Boggs et al. | 712/218 |

* cited by examiner

*Primary Examiner*—Eric Coleman
(74) *Attorney, Agent, or Firm*—Stephen R. Tkacs; Stephen J. Walder, Jr.; Diana R. Gerhardt

(57) ABSTRACT

An apparatus, a method, and a computer program are provided for stalling the performance of commands. In a normal performance system, there are multiple steps that have to be complete for a command to be performed. However, commands may not be performed for a variety of reasons. Typically, a system will utilize a flush mechanism to alleviate a buildup of commands that have not been performed. Flushing, though, can be costly. Therefore, a more efficient system of stalling the performance of commands has been developed to alleviate the problem of missed command performance and the problems associated with system flushes.

12 Claims, 5 Drawing Sheets

METHOD OF AVOIDING FLUSH DUE TO STORE QUEUE FULL IN A HIGH FREQUENCY SYSTEM WITH A STALL MECHANISM AND NO REJECT MECHANISM

BACKGROUND OF THE INVENTION

1. Field of the Invention

The present invention relates generally to the operation of a command queues and, more particularly, to the use of a stall mechanism in a command queue.

2. Description of the Related Art

In conventional computer architectures, there are a variety of devices that employ command queues, such as Direct Memory Access (DMA) devices. The command queues operate by receiving and storing commands issues by a processor or processing device. The commands are communicated through a pipeline to a command queue, where each command is entered into a command entry location or slot. Then, unroll logic issues each command out of the command queue. The problem is that the command queues are finite in depth.

Typically, command queues are inadequate to handle the number of commands in the pipeline. Hence, the command queues can have difficulty in handling back-to-back commands greater than the number of entry locations or slots available in the core of the command queue. The result is that a flush mechanism is typically employed. The flush mechanism causes an instruction unit to back up the code stream of commands when attempted command issuance fails. An instruction backs up the commands and attempts to retry the commands. The problem is that the command starts again at the fetch stage at the beginning of the queue. Restarting commands at the fetch stage can cause greatly increased latencies.

Therefore, there is a need for improving the operation of a flush mechanism in a command queue that addresses at least some of the problems associated with conventional methods and apparatuses for operating command queues.

SUMMARY OF THE INVENTION

The present invention provides an apparatus for stalling command performance in a command performance system. Stall logic is provided, wherein the stall logic at least has the ability to stall performance of a plurality of commands issued by a processor based on at least a use of a known count of a number of commands in a command pipeline and in a command queue and an unknown count prediction of future commands.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in-the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
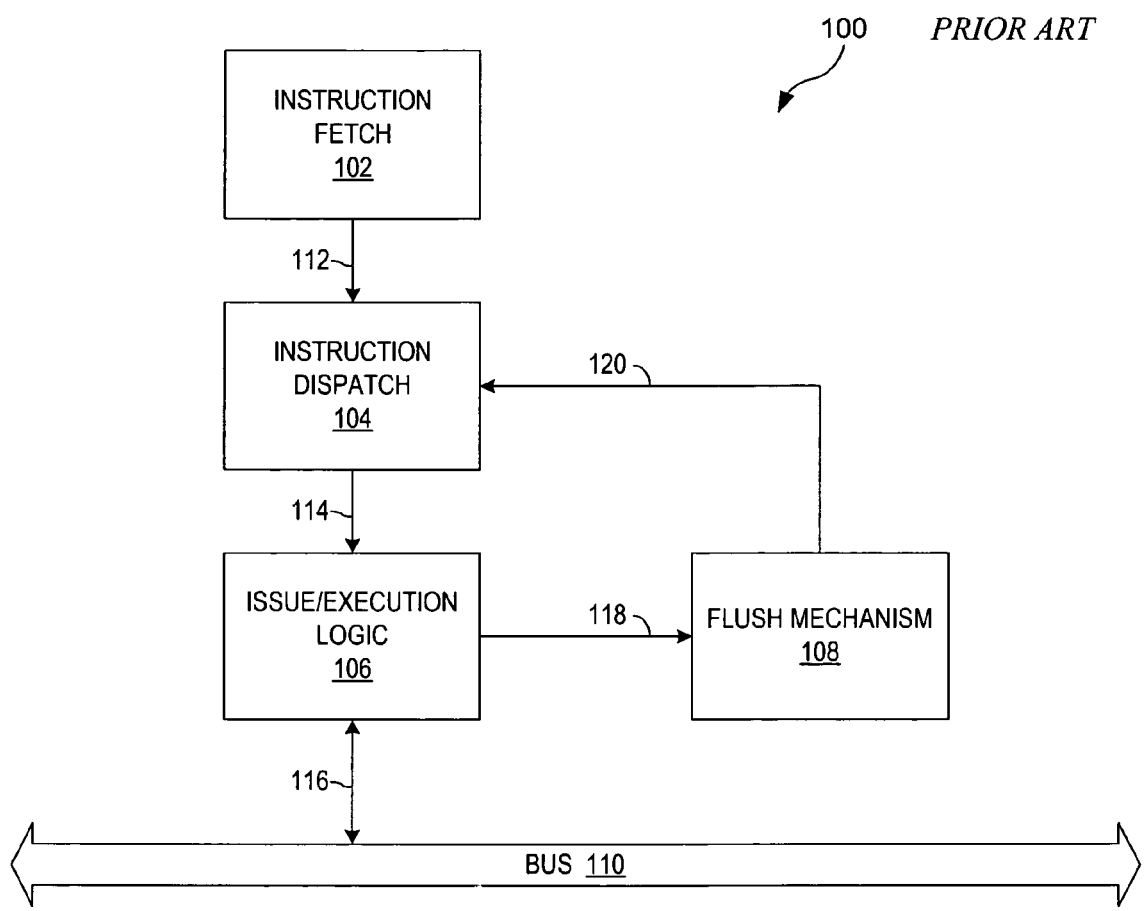
FIG. 1 is a block diagram depicting a conventional processor system with a conventional flush mechanism.

Referring to FIG. 1 of the drawings, the reference numeral 100 generally designates a conventional processor system with a conventional flush mechanism. The processor system 100 comprises as instruction fetch 102, an instruction dispatch 104, issue/execution logic 106, a flush mechanism 108, and a bus 110.

Generally, the convention processor system 100 operates on the issuance and execution of commands through the bus 110. The instruction fetch 102 fetches a command. The fetched command is then communicated through a first communication channel 112 to the instruction dispatch 104. The instruction dispatch 104 stores the command in preparations for eventual execution. The instruction dispatch 104 then communicates the command to the issue/execution logic 106 through a second communication channel 114. The issue/execution logic 106 then attempts to execute the command. A third communication channel 116 between the issue/execution logic 106 and the bus 110 allows for the command to be effectively communicated to other system components (not shown) so that execution can occur.

However, if the command cannot be executed, a different mechanism is employed to alleviate the problem. The inability to execute a command is known as a "miss." If the issue/execution logic 106 cannot execute a command then the missed command is communicated to the flush mechanism 108 through a fourth communication channel 118. The flush mechanism 108 is then able to communicate the missed command back to the instruction dispatch 104 through a fifth communication channel 120, where the issue/execution process for the missed command can be restarted.

The reason for the flushing mechanism is that the depth of the command queue is finite. Typically, commands are continually, or very rapidly, issued. When misses occur, there may no longer be room in the queue. Therefore, the commands are backed up and presented again at the flush point.

Figure 2:
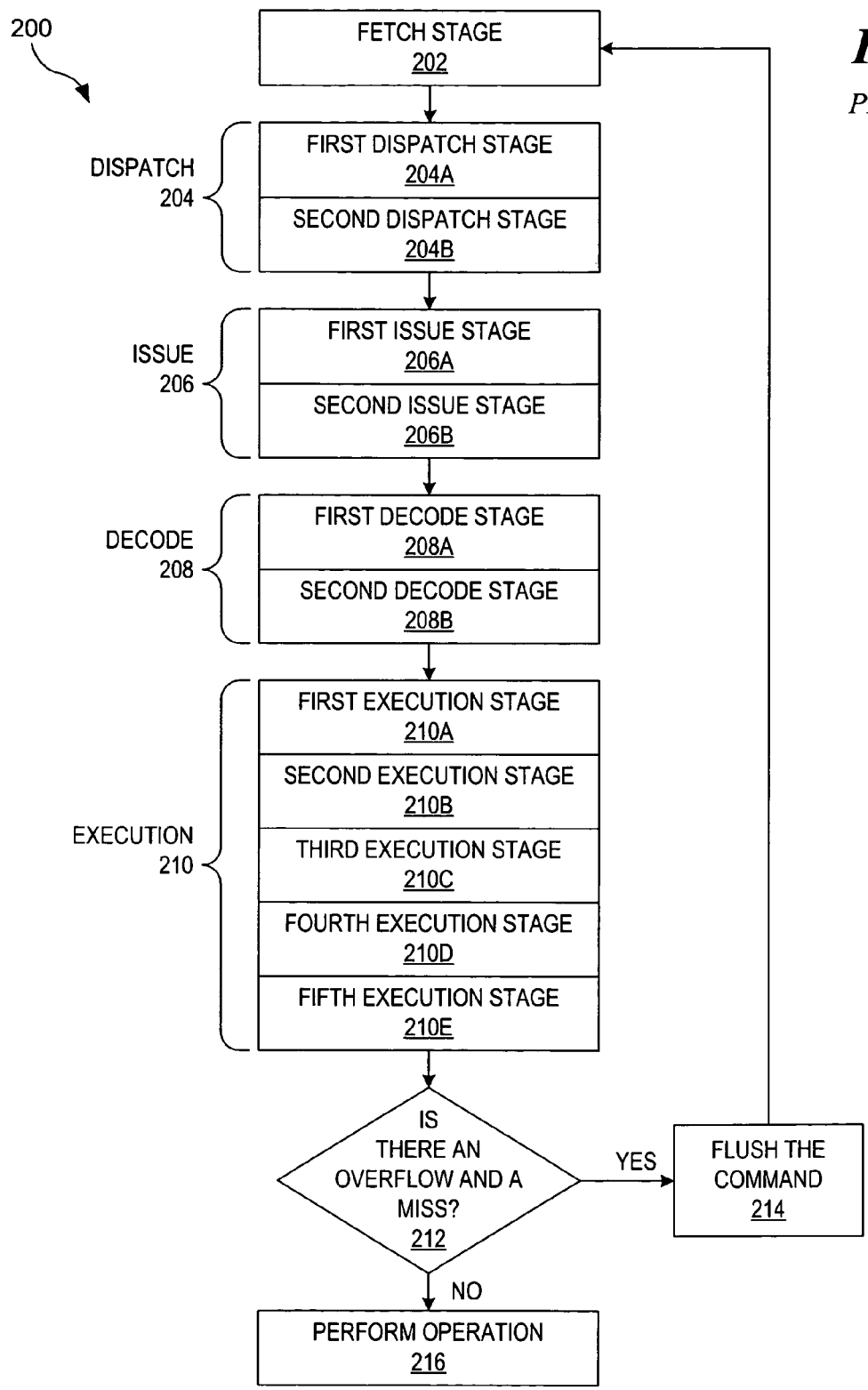
FIG. 2 is a flow chart depicting the operation of a conventional processor system with a conventional flush mechanism.

Referring to FIG. 2 of the drawings, the reference numeral 200 generally designates a flow chart depicting the operation of a conventional processor system with a conventional flush mechanism.

In steps 202 and 204, the command communicated from the instruction fetch 102 of FIG. 1 to the issue/execution logic 106 of FIG. 1. Step 202 is the fetch stage. Steps 204*a* and 204*b* are the first dispatch stage and the second dispatch stage respectively. The first dispatch stage 204*a* and the second dispatch stage 204*b* are collectively known as the dispatch stage 204. Within stages 202 and 204, the command is fetched from the processor (not shown) that generated the command and dispatched to the issue/execution logic 106 of FIG. 1. Also, there can be a multiple fetch stages, or a single fetch stage as shown in FIG. 2, that can vary with the type of processor. There can also be a single dispatch stage, or multiple dispatch stages as shown in FIG. 2, that can vary with the type of processor.

In step 206, the command is issued. The issue stage 206 further comprises a first issue stage 206*a* and a second issue stage 206*b*. Within the first issue stage 206*a* and the second issue stage 206*b*, there are a variety of processes that can take place to prepare the command for eventual execution, such as identifying the type of command. For example, the issue/execution unit 106 of FIG. 1 can detect dependencies, precode operands, and so forth. There can also be a single issue stage, or multiple issue stages, as shown in FIG. 2, that can vary with the type of processor.

In step 208, the command is decoded by the issue/execution logic 106 of FIG. 1. Step 208 further comprises a first decode stage 208*a* and a second decode stage 208*b*. Within the first decode stage 208*a* and the second decode stage 208*b*, there are a variety of processes that can take place to prepare the command for eventual execution, such as determining the specific process involved in executing the command. For example, the issue/execution logic 106 of FIG.1 can identify the operation, such as load, store, a cache operation, and so forth. There can also be a single decode stage or multiple decode stages, as shown in FIG. 2, that can vary with the type of processor.

In step 210, the issue/execution logic 106 of FIG. 1 begins execution of the command. The execution stage 210 further comprises a first execution stage 210*a*, a second execution stage 210*b*, a third execution stage 210*c*, a fourth execution stage 210*d*, and a fifth execution stage 210*e*. There are a variety of processes that can take place to execute the command, such as determining the specific process communicating data to other system components (not shown) through the bus 110. Also, can also be a single execution stage or multiple execution stages, as shown in FIG. 2, that can vary with the type of processor.

After the final execution stage, a determination if the command has missed is made and if there is an overflow 212. There are a variety of signals and data that can be communicated from the issue/execution logic 106 through the bus 110 of FIG. 1 to other system components (not shown) to determine if the command will be performed or will miss. If the command will be performed 216, then data corresponding to the command is moved across the bus 110 of FIG. 1.

On the other hand, if there is a miss with a queue overflow, then another set of steps should be employed. If the other system components (not shown) or the issue/execution logic 106 of FIG. 1 cause the command to miss with a queue overflow, then the command is flushed 21-4. By flushing the command 216, the process of execution ceases. The command is then stored and is re-fetched at the fetch stage 202.

Flushing a command can be a very costly process. By stopping the execution of the command midstream in the process due to the problem of overflow of the command queue, the time to issue and decode are wasted. There are cases where command can miss multiple times before execution. Therefore, causing the repetitive and unnecessary issuing and decoding of missed commands occupies limited computer resources, increasing latencies.

Figure 3:
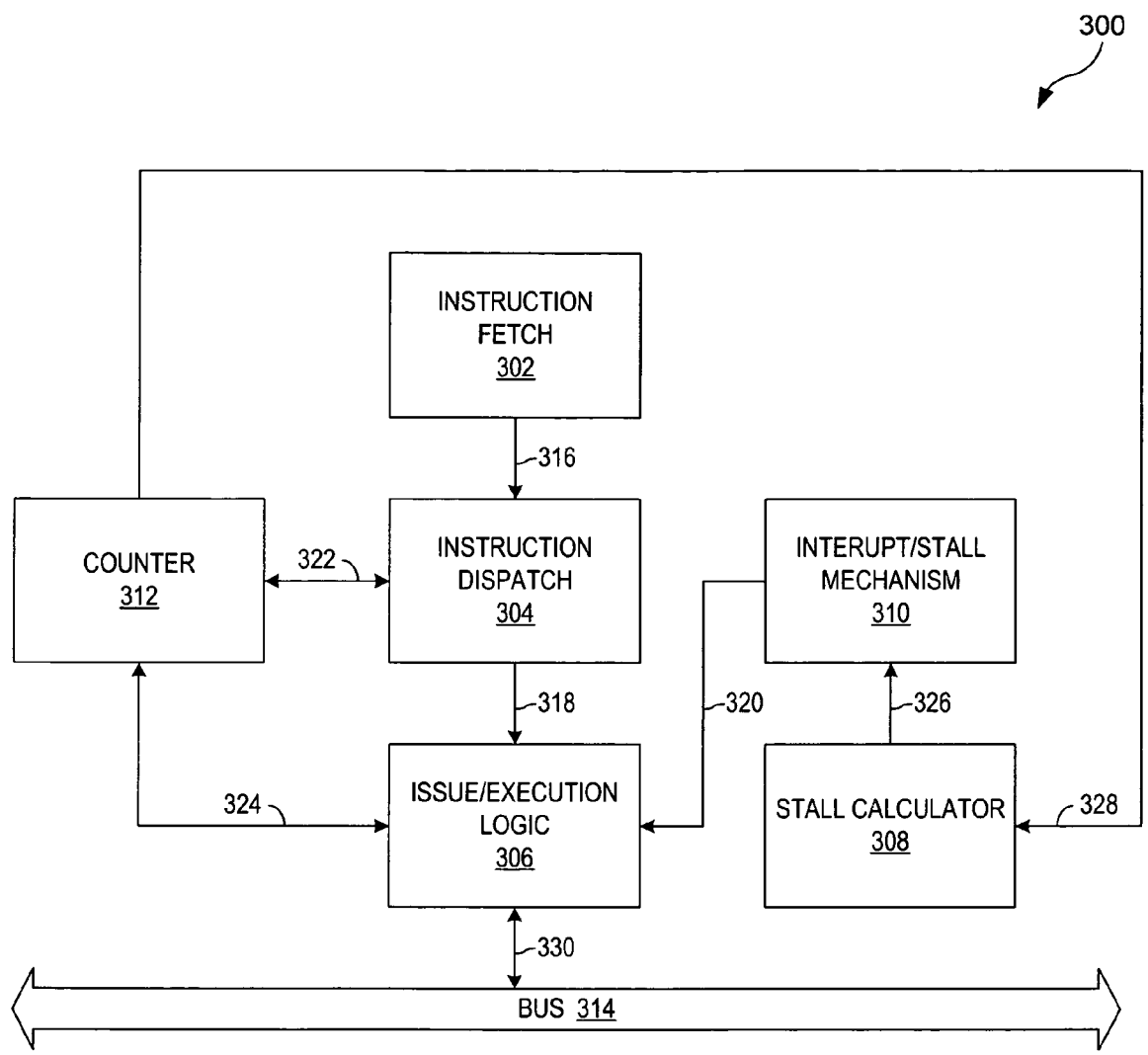
FIG. 3 is a block diagram depicting an improved processor system with a stall mechanism.

Referring to FIG. 3 of the drawings, the reference numeral 300 generally designates a processor system with a stall mechanism for store commands. The improved processor system 300 comprises an instruction fetch 302, an instruction dispatch 304, issue/execution logic 306, a stall calculator 308, an interrupt/stall mechanism 310, counters 312, and a bus 314.

Generally, the convention processor system 300 operates on the issuance and execution of commands through the bus 314. The instruction fetch 302 fetches a command. The fetched command is then communicated through a first communication channel 316 to the instruction dispatch 304. The instruction dispatch 304 communicates the command to the issue/execution logic through a second communication channel 318. The issue/execution logic 306 then attempts to execute and to perform the command. A third communication channel 330 between the issue/execution logic 306 and the bus 314 allows for the command to be effectively communicated to other system components (not shown) so that execution can occur.

However, if the command cannot be executed, a different mechanism is employed to alleviate the problem. The inability to execute a command is known as a "miss." The counters 312 are coupled to the instruction dispatch 304 through a fourth communication channel 322 and to the issue/execution logic 306 through a fifth communication channel 324. Through the fourth communication channel 322 and the fifth communication channel 324, the counters 312 are able to determine two counts: a known count and an unknown count. The known count is the number of commands within the command queue of the issue/execution logic 306 and the commands in the pipeline of first communication channel 316 and second communication channel 318. The unknown count is a prediction of commands that can be directed toward the appropriate queue, but are past the point where the command can be stalled (not shown).

The known and unknown count can then be utilized to induce stalls. The counters 312 communicate the known and unknown counts to the stall calculator 308 through a sixth communication channel 328. The stall calculation made by the stall calculator 308 is based on the sum of the known and unknown counts. The sum of the known and unknown counts should never eclipse the total number of entries in the command queue of the issue/execution logic 306. Therefore, the unknown count can be varied to allow for a greater amount of control of the flow of commands into the command queue. Once the stall calculator has determined made a stall calculation, then interrupt or stall signals are communicated to the interrupt/stall mechanism 310 through a seventh communication channel 326. The interrupt/stall mechanism 310 then can interrupt or stall the flow of commands within the issue/execution logic 306 through an eighth communication channel 320. In other words, the interrupt/stall mechanism 310 prevents queue overflow within the issue/execution logic 306.

Figure 4A:
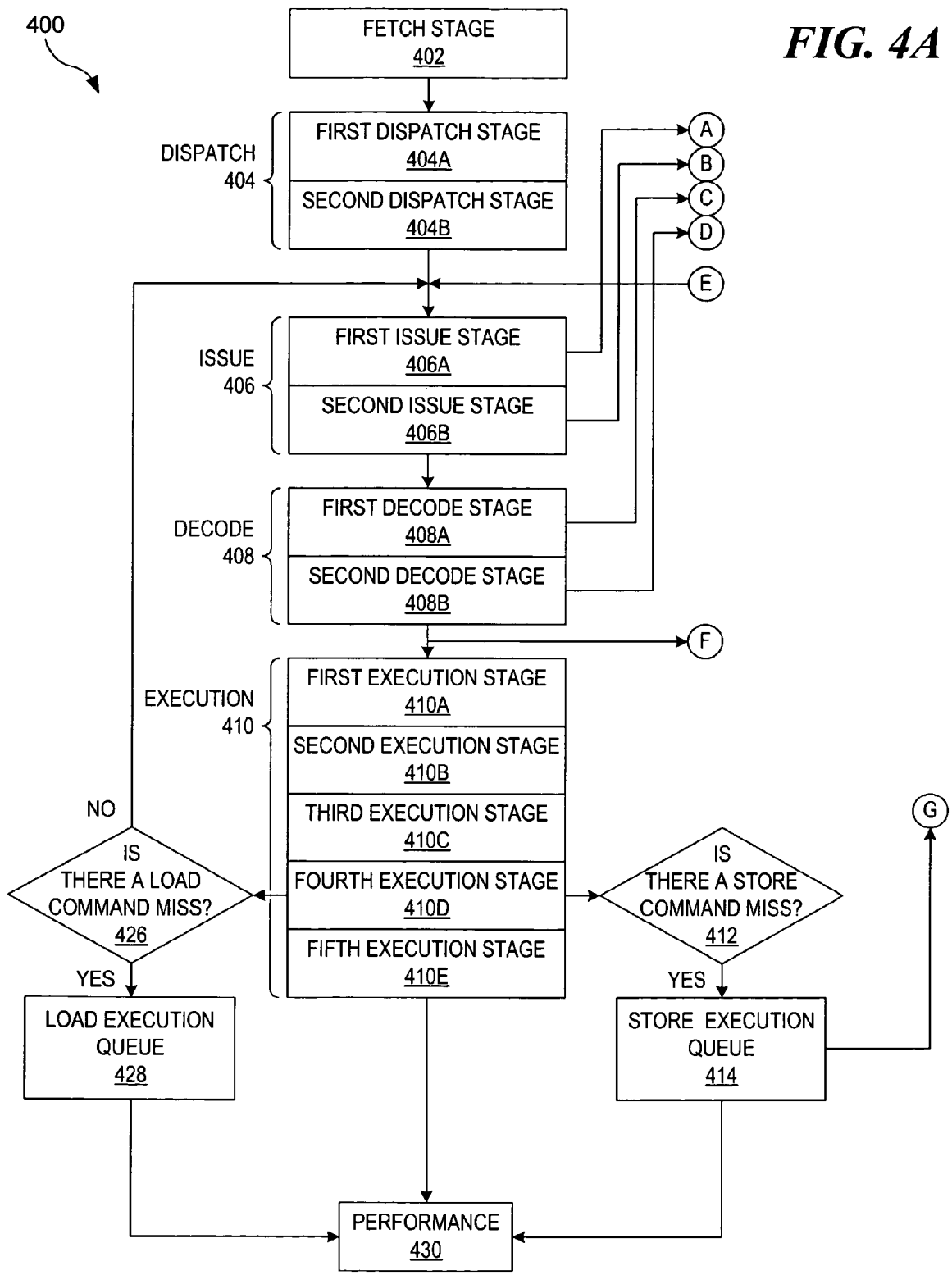
FIGS. 4A and 4B is a flow chart depicting the operation of an improved processor system with a stall mechanism.
Figure 4B:
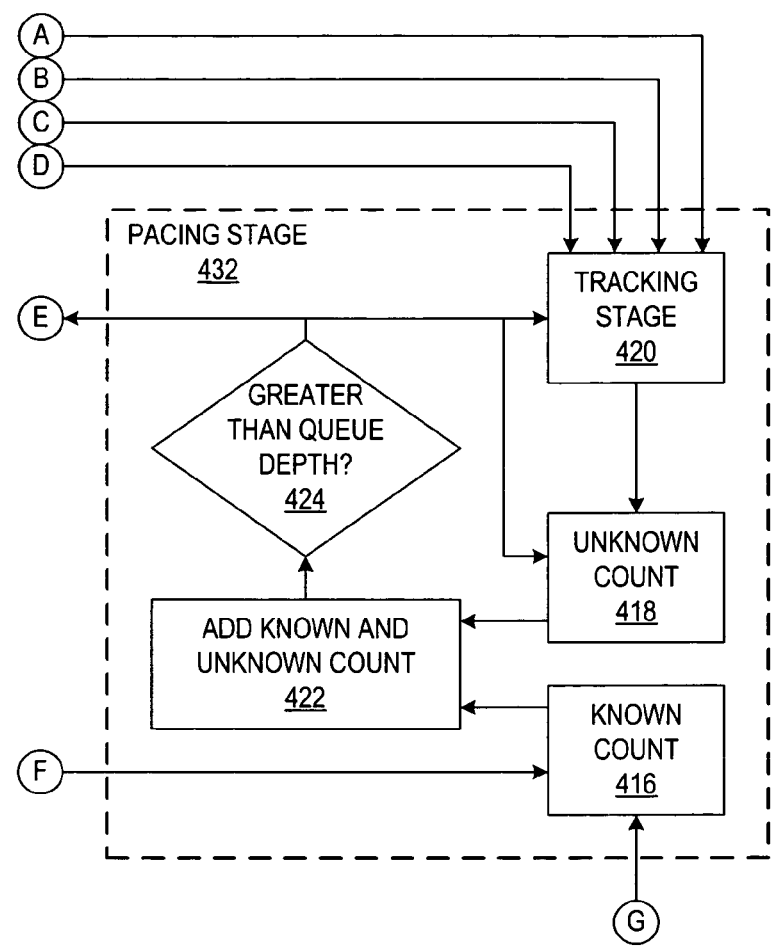

Referring to FIG. 4A and FIG. 4B of the drawings, the reference numeral 400 generally designates a flow chart of the operation of a processor system with a stall mechanism In steps 402 and 404, the command communicated from the instruction fetch 302 of FIG. 3 to the issue/execution logic 306 of FIG. 3. Step 402 is the fetch stage. Steps 404*a* and 404*b* are the first dispatch stage and the second dispatch stage respectively. The first dispatch stage 404*a* and the second dispatch stage 404*b* are collectively known as the dispatch stage 404. Within stages 402 and 404, the command is fetched from the processor (not shown) that generated the command and dispatched to the issue/execution logic 306 of FIG. 3. Also, there can be a multiple fetch stages or a single fetch stage as shown in FIG. 4A, that can vary with the type of processor. There can also be a single dispatch stage or multiple dispatch stages as shown in FIG. 4A, that can vary with the type of processor.

In step 406, the command is issued. The issue stage 406 further comprises a first issue stage 406a and a second issue stage 406b. Within the first issue stage 406a and the second issue stage 406b, there are a variety of processes that can take place to prepare the command for eventual execution, such as identifying the type of command. For example, the issue/execution unit 306 of FIG. 3 can detect dependencies, precode operands, and so forth. There can also be a single issue stage or multiple issue stages, as shown in FIG. 4A, that can vary with the type of processor.

In step 408, the command is decoded by the issue/execution logic 306 of FIG. 3. Step 408 further comprises a first decode stage 408a and a second decode stage 408b. Within the first decode stage 408a and the second decode stage 408b, there are a variety of processes that can take place to prepare the command for eventual execution, such as determining the specific process involved in executing the command. For example, the issue/execution logic 306 of FIG. 3 can identify the operation, such as load, store, a cache operation, and so forth. There can also be a single decode stage or multiple decode stages, as shown in FIG. 4A, that can vary with the type of processor.

In step 410, the issue/execution logic 306 of FIG. 3 begins execution of the command. The execution stage 410 further comprises a first execution stage 410a, a second execution stage 410b, a third execution stage 410c, a fourth execution stage 410d, and a fifth execution stage 410e. There are a variety of processes that can take place to execute the command, such as determining the specific process communicating data to other system components (not shown) through the bus 314 of FIG. 3. Also, can also be a single execution stage or multiple execution stages, as shown in FIG. 4, that can vary with the type of processor.

At the fourth execution stage 410d, if the command is a load command, a determination if a load command has missed is made 426. There are a variety of signals and data that can be communicated from the issue/execution logic 306 through the bus 314 of FIG. 3 to other system components (not shown) to determine if the command will be performed or will miss. If the command will be performed 430, then data corresponding to the command is moved across the bus 314 of FIG. 3 and a completion signal is communicated within the issue/execution logic 306 of FIG. 3 at the issue stage 406. At the issue stage 406, dependencies can be updated to show that the load command is complete.

If there is load command miss, through, another set of steps should be employed. The load command is forwarded to a load command queue 428. Then, once the processor system 300 of FIG. 3 can perform the load command, it is performed 430.

Also, if the command is a store command, at the fourth execution stage 410d, a determination if a store command has missed is made 412. There are a variety of signals and data that can be communicated from the issue/execution logic 306 through the bus 314 of FIG. 3 to other system components (not shown) to determine if the command will be performed or will miss.

However, regardless of whether the store command actually misses, the store command is counted as a miss. Thus, any decoded store command is a store miss. All store commands are communicated to a store execution queue 414. Once a store command is performed 430, a completion signal is communicated to the known count stage 416 of the pacing stage 432, as shown in FIG. 4B.

In order to stall the process though, more input from various stages of the process is needed. Whenever, a store command is decoded at the decode stage 408, a store operation signal is communicated to the known count stage 416 (FIG. 4B). A known count is formulated 416 based on the number of store commands retires or completions 414 and the number of store commands in the decoded store commands 408. Initially, the known count is zero. However, as store commands are decoded, the known count is incremented. Also, as the store commands are retired or completed, the known count is then decremented.

In conjunction with a known count calculation, an unknown count is predicted. Initially, an unknown count is set to a value which covers the latency from when a stall is calculated to when the issue/execution logic 306 of FIG. 3 stalls in response, say five. If the initial value is greater than the latency, then there would be unnecessary stalls. If the initial value is less than the latency, then there can be flushes.

From the known and unknown counts, a stall can then be made when necessary. The unknown count 418 and the known count 416 are then added together 422 (FIG. 4B). A determination then should be made to determine if the known and unknown count are more than the queue depth 424 (FIG. 4B) of the issue/execution logic 306 of FIG. 3. If the addition of known and unknown counts is less than the queue depth of the issue/execution logic 306 of FIG. 3, then no stall command is issued from the pacing stage 432. If the addition of the known and unknown counts is greater than the queue depth of the issue/execution logic 306 of FIG. 3, then a stall is issued to the issue stage 406. The stall blocks store commands from moving from the first issue stage 406a to the second issue stage 406b, stalling the dispatch stage 404 and the fetch stage 402.

Also, in order to operate the system 300 of FIG. 3, the unknown counts also should be modified. Stall requests, and store commands can be located in the first issue stage 406a, the second issue stage 406b, the first decode stage 408a, and the second decode stage 408b. The tracking stage 420 (FIG. 4B) does not monitor what commands are at each stage, but instead computes how many store commands can be in the first issue stage 406a, the second issue stage 406b, the first decode stage 408a, and the second decode stage 408b. When a stall signal is issued, the stall signal decrements the unknown count 418 because a stall is known to be in at least the first issue stage 406a, the second issue stage 406b, the first decode stage 408a, and the second decode stage 408b. Once, a stall has been completed, then the tracking stage 420 increments the unknown count.

The utilization of a stall increases the overall performance of a processor system, such as the system 300 of FIG. 3. The stall or interrupt causes the entry of commands into the command queue to be delayed. Delaying entry allows for missed commands that have exceeded he number of queue entry locations or overflowed to executed more quickly without increasing the latencies that incur with overflows.

It will further be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

The invention claimed is:

1. An apparatus for performing commands, comprising:
   performance logic, wherein the performance logic is configured to perform a plurality of commands issued by a processor, and wherein the performance logic further comprises a command queue having a queue depth equal to a predefined number of slots for storing the plurality of commands issued by the processor;
   a command pipeline, wherein the command pipeline communicates the plurality of commands issued by the processor to the performance logic;
   a plurality of counters, wherein a known counter within the plurality of counters represents a count of a number of commands in the command pipeline and in the command queue, and wherein an unknown counter within the plurality of counters represents a predicted count of future commands that can be directed toward the command queue and are past a point where the future commands can be stalled; and
   stall logic, wherein the stall logic stalls performance of the plurality of commands issued by the processor responsive to a sum of the known counter and the unknown counter being greater than the queue depth.

2. The apparatus of claim 1, wherein the performing logic further comprises:
   fetch logic, wherein the fetch logic retrieves the plurality of commands from the command pipeline to provide a plurality of fetched command;
   decode logic, wherein the decode logic decodes the plurality of fetched command to provide a plurality of decoded commands;
   issue logic, wherein the issue logic issues the plurality of decoded commands to the command queue of the performance logic; and
   execution logic to execute the plurality of decoded command in the command queue.

3. The apparatus of claim 1 wherein the stall logic further comprises:
   a tracking pipeline, wherein the tracking pipeline monitors progress of the plurality of commands and stall requests;
   an incrementer, wherein the incrementer increments the unknown counter responsive to a stall being issued; and
   a decrementer, wherein the decrementer decrements the unknown counter responsive to a stall being completed.

4. A method of stalling performance of commands in a command performance system, comprising: executing a plurality of commands;
   reporting command progress of the plurality of commands to stall logic during execution;
   determining if the performance misses during execution;
   if the performance misses, storing the command in a command queue;
   determining a known count of a number of commands in a command pipeline and in a command queue;
   determining an unknown count prediction of future commands that can be directed toward the command queue and are past a point where the future commands can be stalled;
   determining a sum of the known count and the unknown count; determining if the sum is greater than a predefined number of slots in the command queue; and
   if the sum is greater than a predefined number of slots in the command queue, stalling the command performance based on misses and progress of the plurality of commands.

5. The method of claim 4, where the step of stalling the command performance further comprises receiving a completion signal when stored commands are performed.

6. The method of claim 4, further comprising:
   incrementing the unknown counter responsive to a stall being issued.

7. The method of claim 4, further comprising:
   decrementing the unknown counter responsive to a stall being completed.

8. An apparatus for stalling performance of commands in a command performance system, comprising:
   means for executing a plurality of commands;
   means for reporting command progress of the plurality of commands to stall logic during execution;
   means for determining if the performance misses during execution;
   means for storing the command in a command queue if the performance misses;
   means for determining a known count of a number of commands in a command pipeline and in a command queue;
   means for determining an unknown count prediction of future commands that can be directed toward the command queue and are past a point where the future commands can be stalled;
   means for determining a sum of the known count and the unknown count;
   means for determining if the sum is greater than a predefined number of slots in the command queue; and
   means for stalling the command performance based on misses and progress of the plurality of commands if the sum is greater than a predefined number of slots in the command queue.

9. The apparatus of claim 8, wherein the means for stalling further comprises:
   means for monitoring progress of the plurality of commands and stall requests;
   means for incrementing the unknown counter responsive to a stall being issued; and
   means for decrementing the unknown counter responsive to a stall being completed.

10. The apparatus of claim 8, where the means for stalling the command performance further comprises means for receiving a completion signal when stored commands are performed.

11. The apparatus of claim 8, further comprising:
    means for incrementing the unknown counter responsive to a stall being issued.

12. The apparatus of claim 8, further comprising:
    means for decrementing the unknown counter responsive to a stall being completed.

* * * * *